Figure 1:
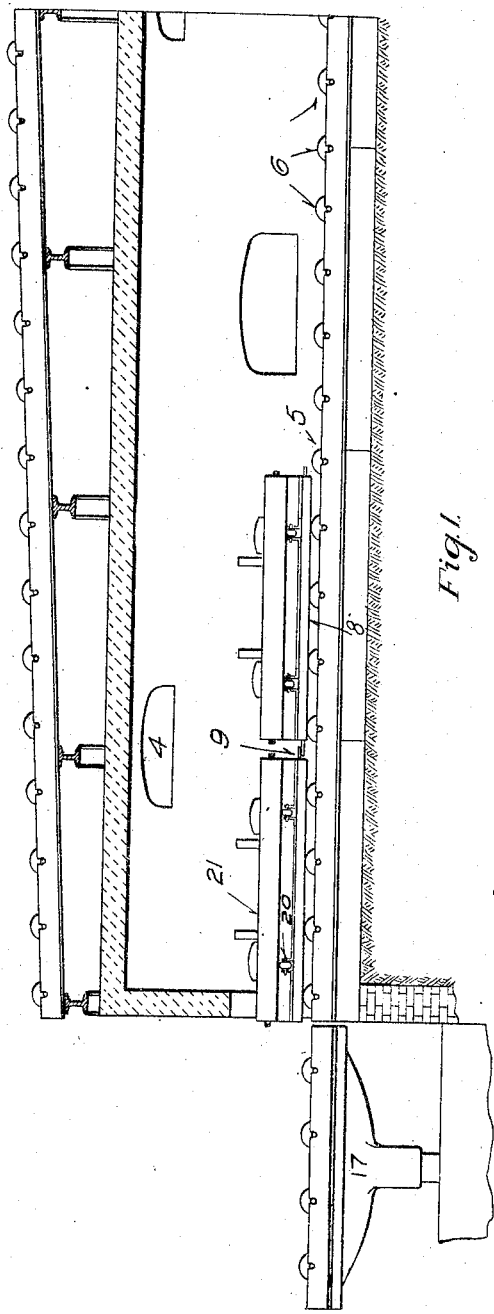

G. C. DE BAY.
GLASS ANNEALING LEER.
APPLICATION FILED MAY 26, 1909.

972,167.

Patented Oct. 11, 1910.
5 SHEETS—SHEET 1.

WITNESSES

INVENTOR
George C. DeBay
By Fred'k W. Winter
Attorney

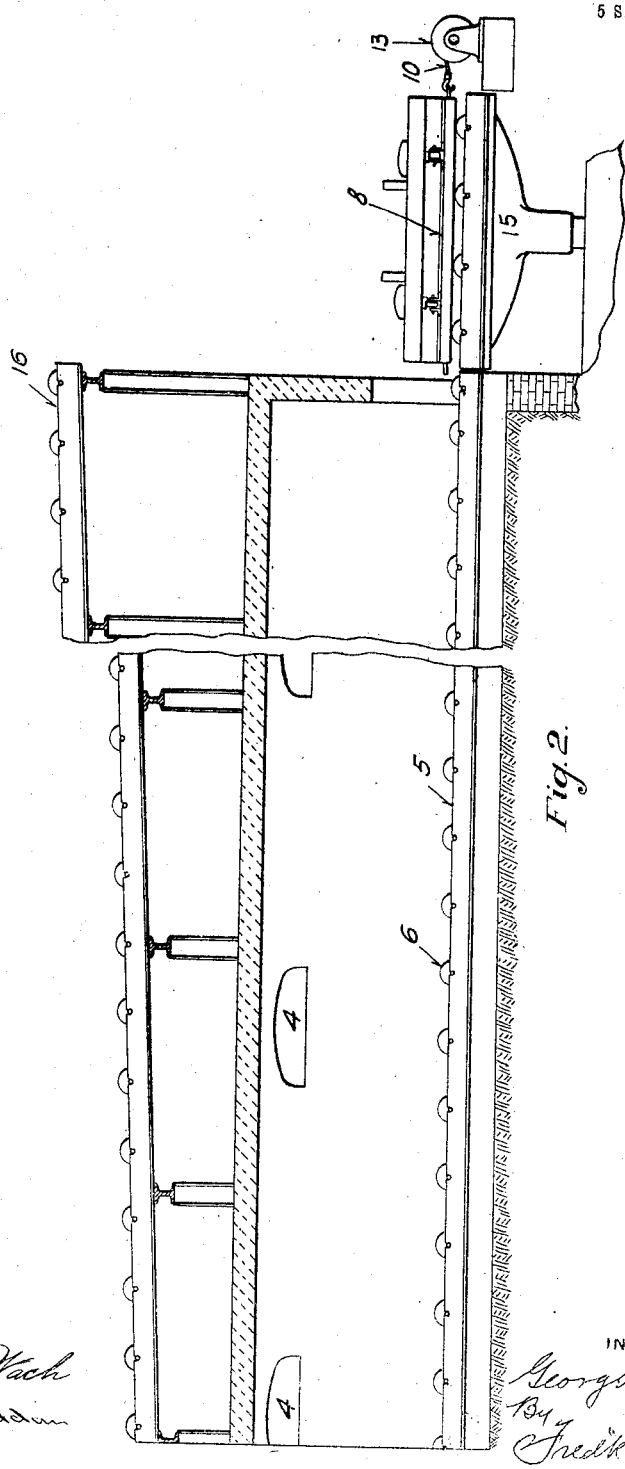

G. C. DE BAY.
GLASS ANNEALING LEER.
APPLICATION FILED MAY 26, 1909.
972,167.
Patented Oct. 11, 1910.
5 SHEETS—SHEET 3.
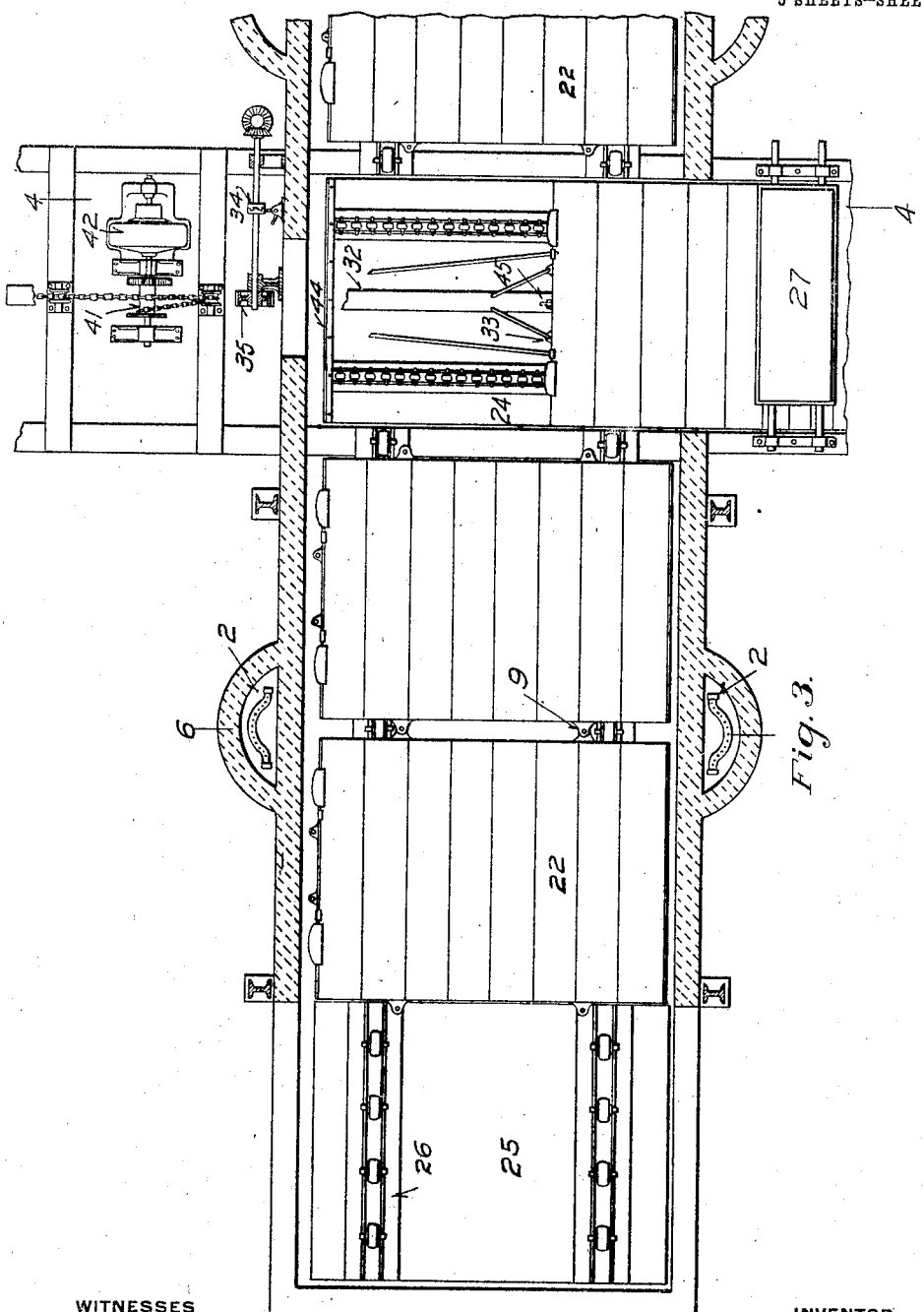

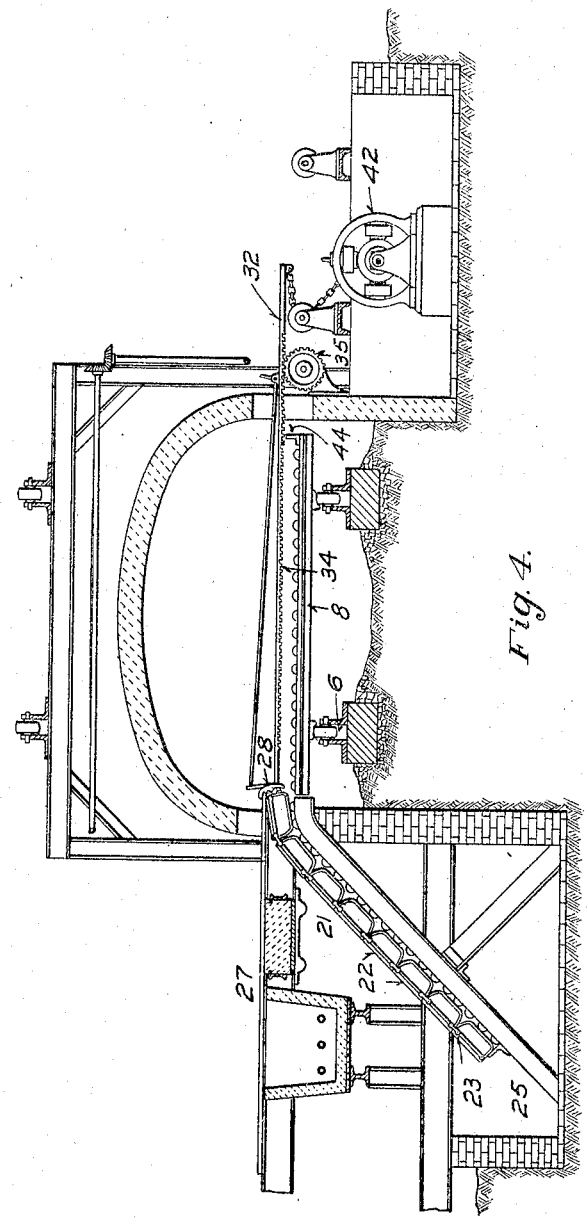

G. C. DE BAY.
GLASS ANNEALING LEER.
APPLICATION FILED MAY 26, 1909.
972,167.
Patented Oct. 11, 1910.
5 SHEETS—SHEET 5.
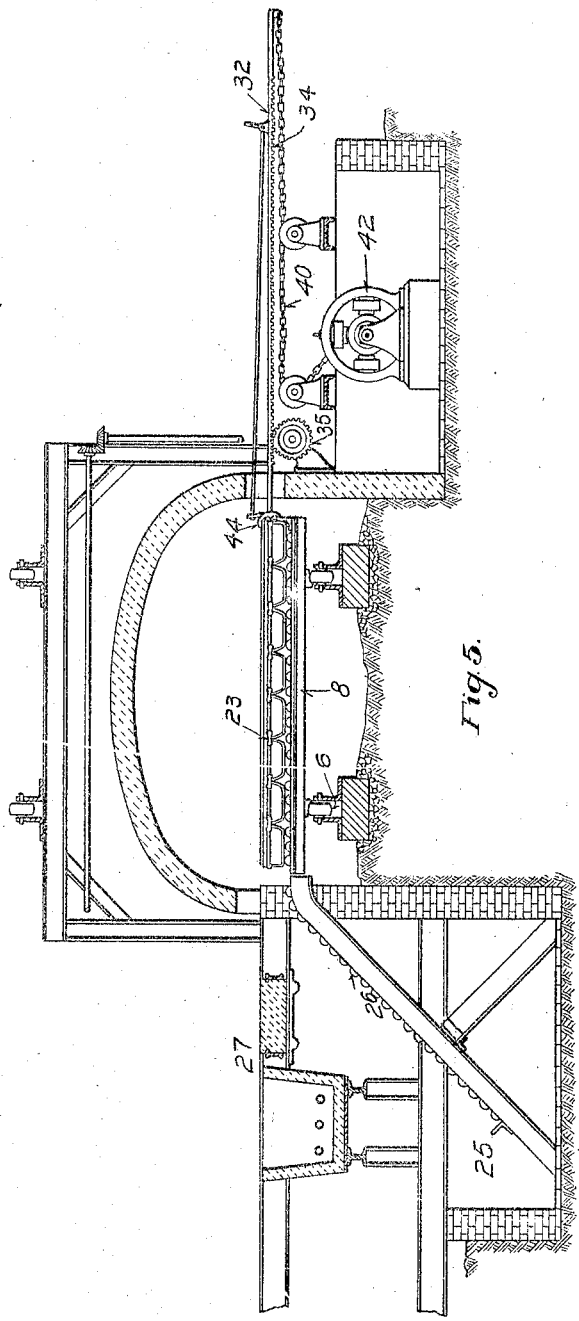
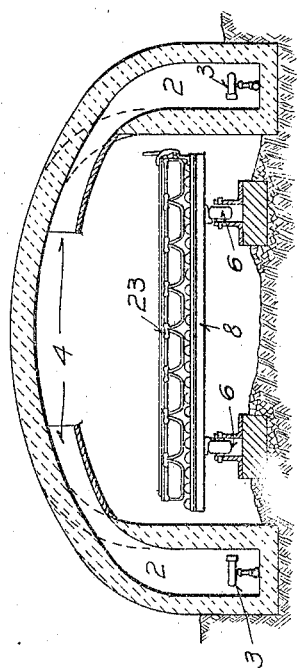
WITNESSES
INVENTOR
George C. DeBay,
By Fred'k W. Winter
Attorney ary with reference to the platform. After the plate has been thus received upon the sectional platform, the platform and plate are moved transversely onto the carriage, this being effected by any suitable means such as the arms 29 which are pivoted at 30 on the pit guides and which may be operated by a pressure cylinder 31 connected by links 32 thereto.

UNITED STATES PATENT OFFICE.

GEORGE C. DE BAY, OF TARENTUM, PENNSYLVANIA, ASSIGNOR OF ONE-HALF TO JOSEPH HEIDENKAMP, OF SPRINGDALE, PENNSYLVANIA.

GLASS-ANNEALING LEER.

972,167.  Specification of Letters Patent.  Patented Oct. 11, 1910.

Application filed May 26, 1909. Serial No. 498,556.

*To all whom it may concern:*

Be it known that I, GEORGE C. DE BAY, a resident of Tarentum, in the county of Allegheny and State of Pennsylvania, have invented a new and useful Improvement in Glass-Annealing Leers, of which the following is a specification.

This invention relates to glass annealing leers, and more particularly to a leer for annealing plates or sheets of glass.

The object of the invention is to provide a leer having provision for giving uniform heating and also with article conveying means so arranged that the plate can be delivered thereto or therefrom without scratching or marring the plate and which will not affect the polish or glaze on the lower surface of the glass which rests upon the conveyer support.

The invention comprises the arrangement of parts hereinafter described and claimed.

In the accompanying drawings Figures 1 and 2 show a vertical longitudinal section of the leer; Fig. 3 is a horizontal sectional view of a portion of the leer showing the conveying mechanism in plan; Fig. 4 is a transverse vertical section on the line 4—4, Fig. 3 showing the parts in position to receive a plate of glass; Fig. 5 is a similar view showing the parts in position with the glass on the conveyer; and Fig. 6 is a transverse sectional view on the line 6—6, Fig. 3.

The leer comprises a suitable chamber 1, preferably of the cross-section shown in Figs. 4, 5 and 6, provided at intervals along the sides with heaters comprising suitable chambers 2 in which are located gas burners 3 and which chambers 2 communicate with the annealing chamber through flues 4. Other arrangements for heating the annealing oven may be employed.

In the annealing chamber is a floor or support 5 upon which is arranged a suitable track for the conveyer, this track comprising a series of small rolls or wheels 6 upon which the conveyer rests and over which it is moved. The conveyer comprises a series of carriages or wagons 8 which rest directly upon the rolls 6 and are propelled along the same by any suitable means. As shown in the drawings the carriages or wagons are coupled together by coupling members 9 and are drawn through the annealing oven by means of a cable 10 detachably connected to the endmost carriage and passing to a power driven drum 13 on which said cable is wound to draw the carriages through the annealing oven. At the delivery end of the leer the carriages run onto a lift or elevator 15 of any suitable type, the one shown being adapted to be operated hydraulically and by means of which a carriage is lifted so that it can be delivered onto a return roller track 16 located above the oven and slightly inclined so that the carriages are returned thereon by gravity to the receiving end of the leer, at which point is located another lift 17 by means of which each carriage is lowered to the level of the track in the leer, and is then hooked onto the last previous carriage in the leer and so again drawn through the leer.

Each of the carriages is in effect a platform which rests directly upon the roller track, and having upon its upper surface transversely arranged tracks 20 which also are formed of a series of rollers upon which rests the plate supporting platform 21, this platform being movable transversely of the carriage to receive articles, such as glass plates, thereon. This platform is formed in a series of sections 22 hinged together at their meeting edges, as shown at 23, and arranged when pushed sidewise off the buggy to be projected through an opening 24 in the side of the leer and extend downwardly into the pit 25. Suitable guides 26 are provided in the pit to support and guide the sectional or flexible platform. The article delivery mechanism is at the side of the leer, adjacent to the pit 25, and in the drawing is indicated by a portion 27 of plate forming and fire finishing mechanism such as described and claimed in my application of even date herewith, Serial No. 498,554, although it may be rollers or other suitable article delivery mechanism. When receiving, for instance, a plate the sectional or flexible platform 21 is in the position shown in Fig. 4, that is, projecting down into the pit as shown. The end of the plate is fed forward positively and also preferably will have its end secured to the sectional platform 21 by means of any suitable clamping means shown at 28, after which the platform is pulled up onto the carriage, the plate being moved forwardly at the same speed so that it is delivered upon the platform without relative sliding movement thereon and consequently is not scratched or abraded nor is its glaze injured.

Any suitable mechanism may be employed for drawing the platform up onto the carriage. The drawings for this purpose show a rack bar 32 having a detachable connection at 33 with the end section of the platform 22 and provided with rack teeth 34 which are engaged by a gear wheel 35 driven from any suitable source of power but preferably from the plate forming and delivery means as described in the application above identified, so that the sectional platform is moved up onto the carriage at the same speed as the movement of the plate. The drawings show the gear 35 driven by bevel gearing and shafts which extend up and over the leer to the receiving side thereof, where they are connected to the driving shaft for the plate forming and feeding mechanism. In order to push the sectional platform off the carriage into the pit the gear 35 could be reversed, but I prefer to connect said gear to its driving shaft by means of a clutch 34ª, and push the rack bar 32 inwardly by connecting to the same a chain or cable 40 adapted to be wound on the drum 41 which is connected to a motor 42. The rack bar 32 is so connected to the sectional platform that it can be readily attached and detached therefrom so that when a carriage with its platform is brought opposite the receiving opening the rack bar is connected to said platform, the latter pushed off the carriage to extend into the pit, the plate clamped to said platform and both drawn together onto the carriage, after which the rack bar is detached to permit the leer conveyer to move forward the length of one carriage when this operation is repeated on the next succeeding carriage. To prevent the sectional platform from moving transversely on the carriage while passing through the leer, the outer end of said platform abuts against a suitable stop 44 and is secured to the buggy by a latch 45, which prevents its movement in the opposite direction.

The mechanism described provides means for delivering a plate onto the conveyer without any sliding movement and so prevents scratching or marring the lower surface of the plate. At the delivery end of the oven a similar arrangement may be applied for delivering the plate from the leer conveyer onto a driven conveyer for carrying the plate away. The arrangement of such device would be exactly similar to that shown for receiving the plate. It would merely be reversely operated.

The flues 4 are so arranged that they project the heat horizontally at the top of the annealing chamber, and preferably at the center, so that the edges of the article on the leer conveyer are not overheated. The air as it cools naturally settles down in uniform horizontal strata so that the plate or other article on the conveyer is uniformly and evenly heated. At the entrance end of the leer before the articles are delivered onto the conveyer, the platforms 21 become thoroughly heated, so that the subsequent introduction of heat above the plate insures the latter being uniformly heated on both surfaces, and it gradually cools off uniformly. Toward the exit end of the leer the heat gradually decreases as is usual. In order that the lower surface of the plate or other article may not be clouded or rendered dull by contact with the platform on which it rests and under the heat of annealing, said platform is made of a substance which has neither adherence to or affinity for hot glass. In the preferred form the sections of this platform are molded blocks consisting of a mixture of fine smooth carbon, such as lamp black, or a fine smooth charcoal or charflake, such as produced by charring oak wood, and which contains no grit or other matter likely to injure or scratch the glass, together with a suitable binder for such fine carbon, the binder preferred being plaster of paris, which is mixed with the carbon in substantially equal quantities by volume. Blocks formed from this composition are perfectly smooth and non-porous, do not adhere to the glass and do not cloud or injure the finish or polish of the surface resting thereon. The blocks or slabs of this composition are set into suitable metal frames forming the sections of the plate receiving platform.

The operation of the leer conveying and receiving mechanism will be readily understood from the foregoing description. By means of it large glass articles such as sheets or plates can be conveniently handled and thoroughly annealed and in a manner not to scratch or otherwise injure the polished or glazed surfaces thereof.

What I claim is:

1. In glass annealing apparatus the combination of a leer, a conveyer therein, a platform mounted on the conveyer and movable transversely thereof to be projected through the side of the leer, and mechanism arranged to be detachably connected to said platform for moving the same transversely off from and onto the conveyer.

2. In glass annealing apparatus the combination of a leer, a conveyer therein, a platform formed in sections flexibly connected together and mounted on the conveyer and movable transversely thereof, and mechanism for moving said platform transversely of the conveyer.

3. In glass annealing apparatus the combination of a leer, a conveyer therein, a platform comprising a number of sections flexibly connected together and mounted on the conveyer to be movable transversely thereof, a pit at the side of the leer into which said sectional platform can project and mechanism for moving said platform transversely of the conveyer.

4. In glass annealing apparatus the combination of a leer, a conveyer therein, a platform comprising sections flexibly connected together and mounted on the conveyer to move transversely thereof, and mechanism arranged to be readily connected to and disconnected from said platform and serving to move the same transversely of the conveyer.

5. In glass annealing apparatus the combination of a leer, a conveyer therein, a platform formed of sections flexibly connected together and mounted on the conveyer to move transversely thereof, and a reciprocating actuating member arranged for ready connection to and disconnection from said platform.

6. In glass annealing apparatus the combination of a leer, a conveyer therein, a platform formed in sections flexibly connected together and mounted on the conveyer to move transversely thereof, a clamp for securing articles to the platform, and mechanism for moving said platform transversely of the conveyer.

7. In apparatus for annealing glass the combination of a leer, a conveyer therein, a platform comprising a series of sections flexibly connected together and mounted on the conveyer to move transversely thereof, mechanism for moving said platform transversely on said conveyer, and means for locking said platform to said conveyer.

8. In glass annealing apparatus the combination of a leer provided with an opening in its side, delivery means adjacent to said opening, a conveyer in said leer, a platform composed of sections flexibly connected and mounted on said conveyer to move transversely thereof and arranged when moved off the conveyer to extend downwardly, and mechanism arranged to move said platform transversely of the conveyer off from and onto the same.

9. In glass annealing apparatus the combination of a leer, a track therein, a series of carriages moving on said track and forming a conveyer, a platform on each carriage and comprising a series of sections hinged together and mounted on the carriage to move transversely thereof, and mechanism located in the course of travel of the carriages and arranged to be connected to said platform and move the same transversely of the carriage.

In testimony whereof, I have hereunto set my hand.

GEORGE C. DE BAY.

Witnesses:
F. W. WINTER,
JOHN S. CORT.